United States Patent
Chan et al.

(10) Patent No.: US 10,992,572 B2
(45) Date of Patent: *Apr. 27, 2021

(54) TRANSACTION DISTRIBUTION WITH AN INDEPENDENT WORKLOAD ADVISOR

(71) Applicant: International Business Machines Corporation, Armonk, NY (US)

(72) Inventors: Yuk L. Chan, Rochester, NY (US); Christopher Cramer, Troy, NY (US); Robert G. King, Longmont, CO (US); Deepti M. Naphade, Fishkill, NY (US); Jairo A. Pava, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/798,946

(22) Filed: Oct. 31, 2017

(65) Prior Publication Data

US 2018/0069785 A1    Mar. 8, 2018

Related U.S. Application Data

(63) Continuation of application No. 15/410,868, filed on Jan. 20, 2017, now Pat. No. 9,832,113, which is a
(Continued)

(51) Int. Cl.
*H04L 12/721* (2013.01)
*H04L 29/08* (2006.01)
(Continued)

(52) U.S. Cl.
CPC .......... *H04L 45/44* (2013.01); *H04L 61/2007* (2013.01); *H04L 67/10* (2013.01); *H04L 67/1008* (2013.01); *H04L 67/42* (2013.01)

(58) Field of Classification Search
USPC ......................................................... 709/238
See application file for complete search history.

(56) References Cited

U.S. PATENT DOCUMENTS

6,167,427 A * 12/2000 Rabinovich ......... H04L 67/1002
707/999.202
7,099,915 B1    8/2006 Tenereillo et al.
(Continued)

*Primary Examiner* — Normin Abedin
*Assistant Examiner* — Hien V Doan
(74) *Attorney, Agent, or Firm* — Cantor Colburn LLP; Teddi Maranzano (57) ABSTRACT

A computer-implemented method includes providing a first mapping between a set of two or more IP addresses and a set of two or more servers. The first mapping is embodied in a virtual network layer modifiable by a workload advisor based on a weight recommendation. A plurality of transactions are received from a load balancer. The weight recommendation for the servers is received, where the weight recommendation defines a goal for weighting transactions among the servers. A second mapping, from the two or more IP addresses to the servers, is determined dynamically by the workload advisor, based on the weight recommendation and absent communication between the load balancer and the workload advisor. A second plurality of transactions are received and are routed to the servers through the virtual network layer according to the second mapping.

17 Claims, 4 Drawing Sheets

Related U.S. Application Data continuation of application No. 14/056,285, filed on Oct. 17, 2013, now Pat. No. 9,584,595.

(51) Int. Cl.
 *H04L 29/12* (2006.01)
 *H04L 29/06* (2006.01)

(56) References Cited

U.S. PATENT DOCUMENTS

| | | |
|---|---|---|
| 7,305,429 B2 | 12/2007 | Borella |
| 7,441,045 B2 | 10/2008 | Skene et al. |
| 7,469,295 B1 | 12/2008 | Gangadharan |
| 7,512,702 B1 | 3/2009 | Srivastava et al. |
| 7,860,097 B1 * | 12/2010 | Lovett ................. H04L 12/4641 370/392 |
| 8,296,434 B1 | 10/2012 | Miller et al. |
| 9,584,595 B2 | 2/2017 | Chan et al. |
| 2004/0260745 A1 | 12/2004 | Gage et al. |
| 2007/0022426 A1 | 1/2007 | Steinder |
| 2017/0142005 A1 | 5/2017 | Chan et al. |

\* cited by examiner

TRANSACTION DISTRIBUTION WITH AN INDEPENDENT WORKLOAD ADVISOR

DOMESTIC PRIORITY

This application is a continuation of and claims priority from U.S. patent application Ser. No. 15/410,868, filed on Jan. 20, 2017, entitled "TRANSACTION DISTRIBUTION WITH AN INDEPENDENT WORKLOAD ADVISOR," which in turn claims priority from U.S. Pat. No. 9,584,595, issued Feb. 28, 2017, the entire contents of each of which are incorporated herein by reference.

BACKGROUND

Various embodiments of this disclosure relate to workload management and, more particularly, to effective transaction distribution absent traditional communication between a load balancer and a group weight manager.

In a conventional load-balancing system, a group weight manager (GWM) communicates with a load balancer to facilitate reasonable assignments of transactions to various available servers. The GWM provides historical, real-time insights into the servers processing the transactions from the load balancer. The GWM generates weights using those insights, where the weights apply to the servers. The weights are the bases for recommendations to the load balancer for the distribution of incoming transactions to those servers. Examples of GWMs include the IBM® Unified Resource Manager (URM) and Enterprise Workload Manager (EWLM).

For intelligent load balancing to be successful, the load balancer must implement a protocol that accepts weight recommendations from the GWM. Server/Application State Protocol (SASP) is such a protocol. Whether SASP is adopted into a particular load balancer depends on market traction and the budget available to the load balancer's vendor to develop and maintain SASP support. Many load balancers do not support the SASP protocol today, making it difficult to use these load balancers with hardware from other vendors. Thus, there are drawbacks to supporting SASP, as well as drawbacks for not supporting it.

SUMMARY

In one embodiment of this disclosure, a computer-implemented method includes providing a mapping between a set of two or more IP addresses and a set of two more servers. A weight recommendation for the servers is received, based at least in part on server data related to current states of the servers, where the weight recommendation represents a goal for distributing a plurality of transactions among the servers. The mapping is modified based at least in part on the weight recommendation. A transaction is received, directed toward a first IP address of the two or more IP addresses. The transaction is routed to a first server, of the two or more servers, associated with the first IP address according to the modified mapping.

In another embodiment, a distribution system includes a virtual networking layer. The virtual networking layer is configured to: receive a weight recommendation from a workload advisor, where the weight recommendation is based at least in part on server data representing a current state of a set of two or more servers; modify a mapping between a set of two or more IP addresses and the two more servers based at least in part on the weight recommendation; receive a transaction directed toward a first IP address of the two or more IP addresses; and route the transaction to a first server of the two or more servers, based on the first IP address being mapped to the first server in the modified mapping.

In yet another embodiment, a computer program product includes a computer readable storage medium having computer readable program code embodied thereon. The computer readable program code is executable by a processor to perform a method. The method includes providing a mapping between a set of two or more IP addresses and a set of two more servers. According to the method, a weight recommendation for the servers is received, based at least in part on server data related to current states of the servers, where the weight recommendation represents a goal for distributing a plurality of transactions among the servers. The mapping is modified based at least in part on the weight recommendation. A transaction is received, directed toward a first IP address of the two or more IP addresses. The transaction is routed to a first server, of the two or more servers, associated with the first IP address according to the modified mapping.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure relate to a distribution system in which a load balancer need not use a conventional protocol, such as SASP, to receive weight recommendations from a GWM. Rather, in an exemplary embodiment, the load balancer may assign transactions using a predetermined method, such as round robin distribution, and dynamic adjustment of IP addresses may determine which servers receive the transactions.

Figure 1:
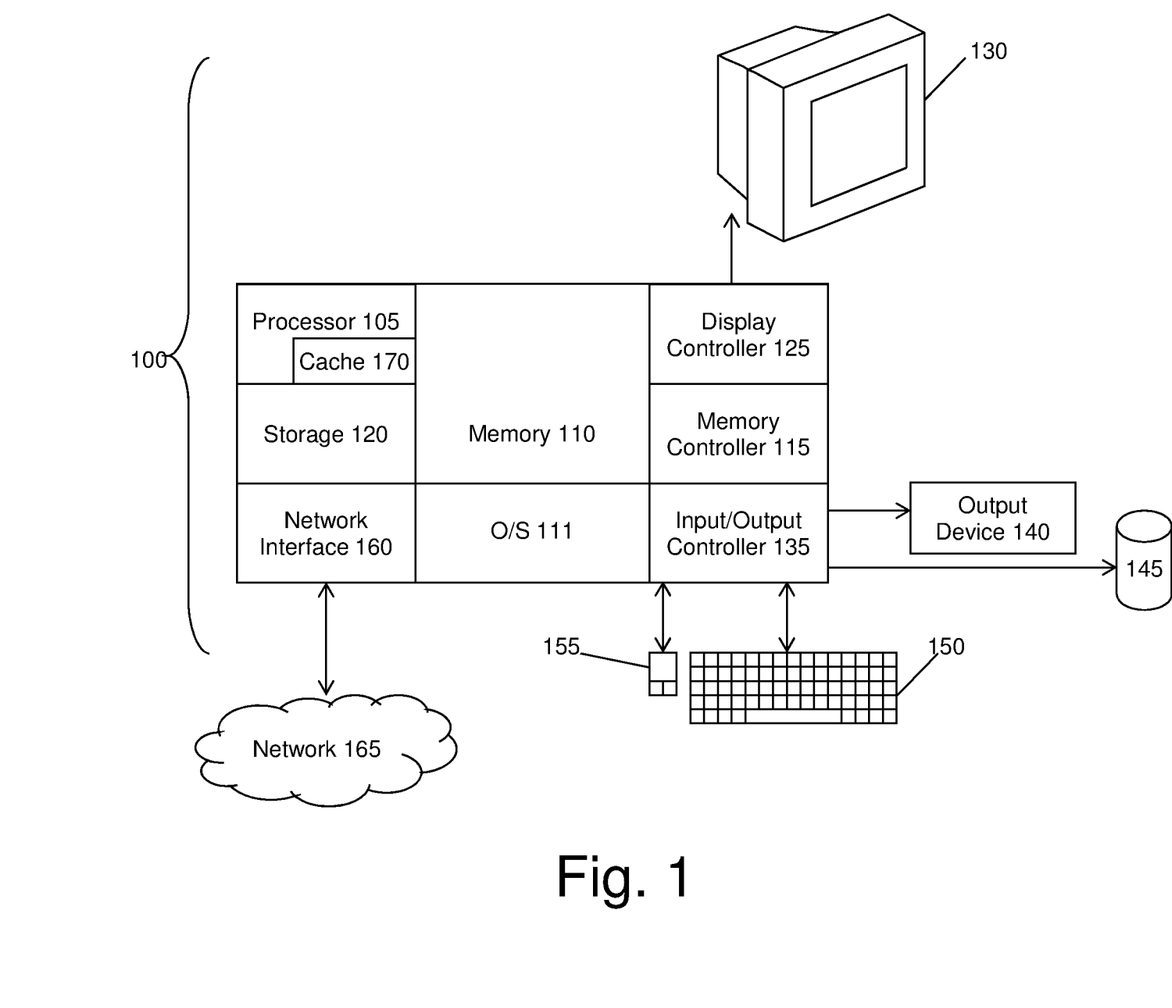
FIG. 1 is a block diagram of a computing device for implementing some aspects of a distribution system, according to an exemplary embodiment of this disclosure.

FIG. 1 illustrates a block diagram of a computer system 100 for use in implementing a distribution system or method according to some embodiments. The distribution systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 100, such as that illustrated in FIG. 1.

Figure 2:
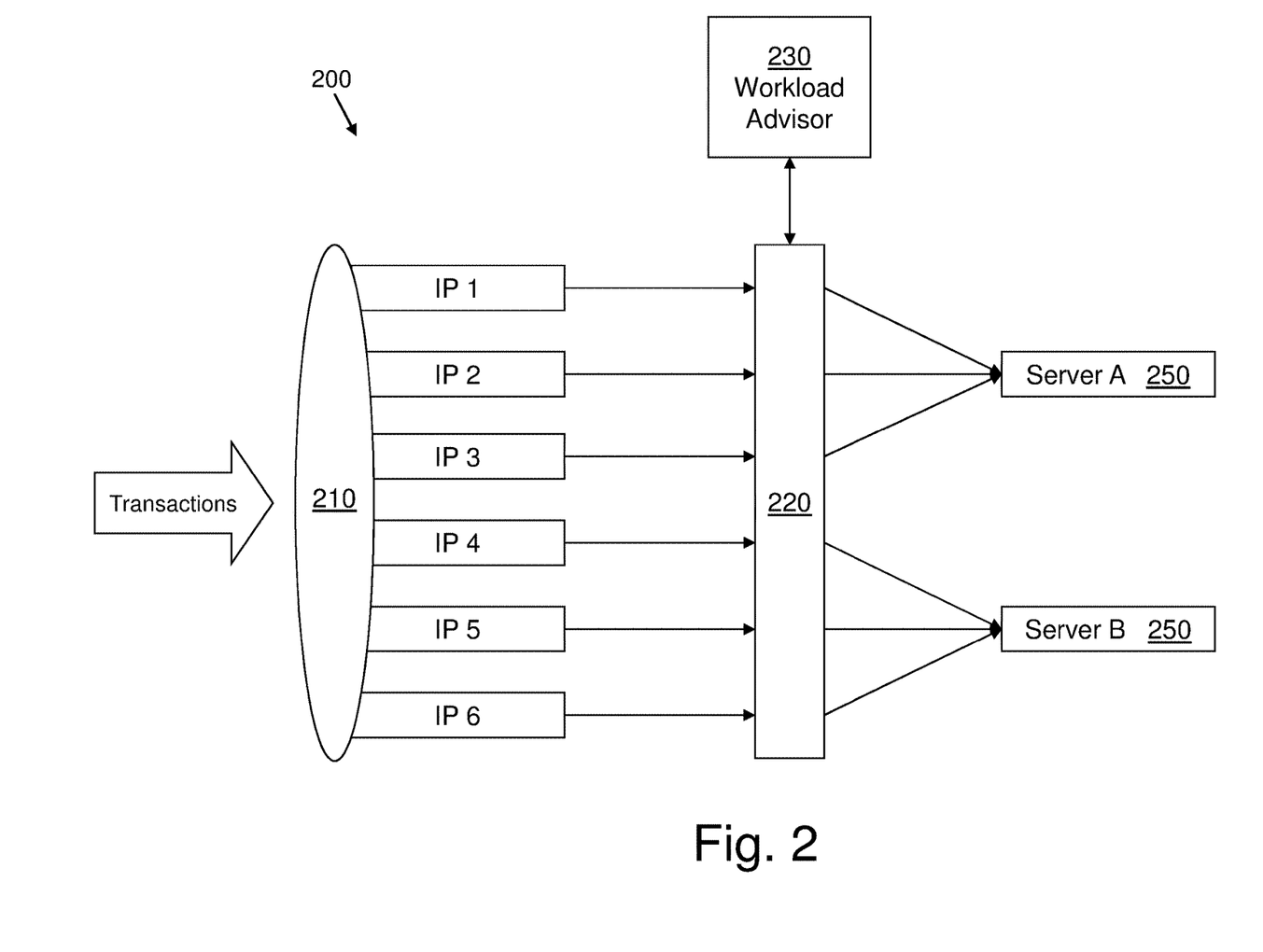
FIG. 2 is a block diagram of the distribution system at initialization, according to an exemplary embodiment of this disclosure.

FIG. 2 illustrates the distribution system 200 at initialization, according to an exemplary embodiment of this disclosure. As shown, the distribution system 200 may include a load balancer 210, a virtual networking layer 220, and a workload advisor 230. The distribution system 200 may provide an alternative to use of the SASP protocol. According to some embodiments, the load balancer 210 is not required to receive weights from a group weight manager. Instead, the workload advisor 230 may work in conjunction with the virtual networking layer 220 to ensure proper balancing.

In conventional systems, weight recommendations provided by the GWM, which is in communication with the servers, inform the load balancer 210 about how transactions should be assigned based on the servers' current states. In an exemplary distribution system 200, however, the load balancer 210 may assign work in a round robin fashion to a set of IP addresses, without concern about weights representing a set of servers 250 that will ultimately handle the transactions. In some other embodiments, methods of assignment other than round robin may be used, without regard to the current state of the various servers 250. Each IP address may be mapped by the virtual networking layer 220 to one of the servers 250. The virtual networking layer 220 and the workload advisor 230 may work together to determine the current statuses of the servers and to reassign the IP addresses accordingly. Thus, neither the virtual networking layer 220 nor the workload advisor 230 may be required to communicate with the load balancer 210 through SASP. Rather, the virtual networking layer 220 and the workload advisor 230 may be in communication with each other, and the virtual networking layer 220 may be in communication with the servers 250.

At initialization of the distribution system 200, the IP addresses may be equally or approximately equally distributed among the servers 250, which may be virtual or physical servers. As far as the load balancer 210 is concerned, each IP address may be treated as a distinct entity associated with a distinct virtual server. The load balancer 210 may use a round robin style of assigning work, where each IP address is assigned a single transaction within a round of transaction assignments, and then the load balancer 210 loops back around to the first IP address for another round of assignments. The IP addresses may all be directed toward the virtual network layer 220, which may route each transaction to the server 250 currently associated with the IP address to which the load balancer 210 assigned that transaction. It will be understood that, although this disclosure refers repeatedly to round robin assignments, other methods of assignment may be used by the load balancer 210 as well.

The virtual networking layer 220 may maintain a mapping between the IP addresses and the servers 250, indicating the server 250 with which each IP address is currently associated. While each IP address may be directed to no more than a single server 250 at a given time, each server may be associated with zero, one, or more IP addresses at a given time. As shown in FIG. 2, the virtual networking layer 220 may route work that is assigned to the virtual IP addresses. This routing may be based on the current mapping of IP addresses to servers 250, which may be based at least in part on a weight recommendation provided by the workload advisor 230.

The virtual networking layer 220 may dynamically update the current mapping of IP addresses to servers 250, based on data received from the workload advisor 230. By dynamically modifying the mappings between the IP addresses and the servers 250, dependency on SASP may be removed, as adjustments may be made by the virtual networking layer 220 based on current server states. The net effect may be that the load balancer 210 need not be aware of server weights or weight recommendations. Weight recommendations may instead be handled by the workload advisor 230 and communicated to the virtual networking layer 220. Hence, various load balancers 210 capable of simple round robin distribution, or other distribution algorithms, may now take advantage of weighted load balancing according to various embodiments of this disclosure.

The virtual networking layer 220 may receive feedback from the servers 250, informing the virtual networking layer 220 of the current states of the servers 250. The virtual networking layer 220 may pass this data on to the workload advisor 230, which may analyze the data to adjust the current weight recommendation associated with the servers 250. The weight recommendation may, in some embodiments, provide a suggested ratio describing how transactions should be distributed among the servers 250.

In some embodiments, currently existing methods of determining weight recommendations may be used by the workload advisor 230. Accordingly, in some embodiments, a conventional GWM or a modified GWM may be used as the workload advisor 230. For example, and not by way of limitation, the workload advisor 230 may be IBM's Uniform Resource Manager. Based on its analysis, the workload advisor 230 may pass recommendations for new or adjusted weights to the virtual networking layer 220.

The virtual networking layer 220 may receive a weight recommendation from the workload advisor 230 and may modify the IP address mapping as needed to achieve the weight recommendation, or to achieve server weights that are reasonably close to the weight recommendation. Servers 250 that the weight recommendation indicates can handle more work may be assigned additional IP addresses, adjusting the current mappings accordingly. Analogously, servers 250 that the weight recommendation indicates are overloaded, or loaded more so than other servers 250, may have one or more of their IP addresses reassigned to other servers 250. In other words, the virtual networking layer 220 may adjust the mappings between the virtual IP addresses and the servers 250 to account for the current states of the servers 250 as reflected in the weight recommendation.

In the example shown in FIG. 2, six IP addresses are defined to the load balancer 210, which distributes transactions to these six IP addresses approximately equally, such as by way of a round robin algorithm. At initialization of the distribution system 200, three IP addresses are mapped to each of the servers 250 responsible for processing transactions.

For the sake of this example, suppose Server A runs into a performance or availability problem. The existence of this problem may be passed from the server 250 to the virtual networking layer 220, which may pass this information to the workload advisor 230. The workload advisor 230 may then adjust its weight recommendation accordingly, to suggest that Server A should have a reduced workload compared to Server B.

Figure 3:
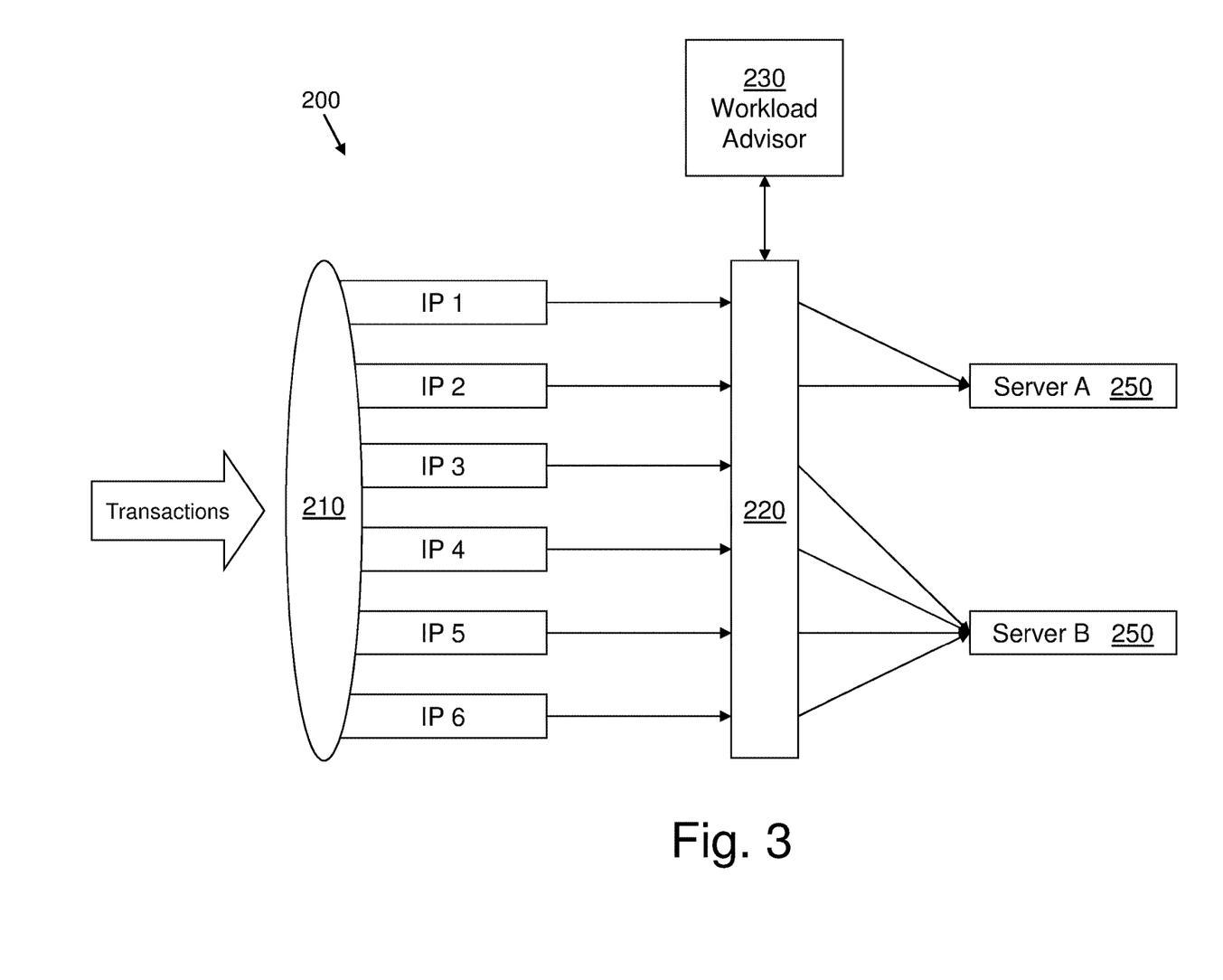
FIG. 3 is a block diagram of the distribution system of FIG. 2 after a weight adjustment, according to an exemplary embodiment of this disclosure.

FIG. 3 is a diagram of the distribution system 200 of FIG. 2, after an adjustment has been made in light of the above-described problem at Server A. The workload advisor 230 may send the adjusted weight recommendation to the virtual networking layer 220. As a result, the virtual networking layer 220 may remove the mapping from one of the IP addresses to Server A, and may instead map that IP address to Server B. The load balancer 210 need not make changes to its distribution processes in light of this adjustment. Until a future adjustment is made, Server B will now receive work that is assigned to four of the six IP addresses, while Server A will receive work assigned to only two of the six IP addresses. It will be understood that more or fewer than six virtual IP addresses may be used, and that more or fewer than two servers may be used.

It will be further understood that the ability to reassign an IP address need not be the entire scope of adjustments that the virtual networking layer 220 can make. In some embodiments, the virtual networking layer 220 may remove a mapping of an IP address to a server 250, without reassigning that IP address to another server 250, thus allowing the load balancer 210 to detect the missing resource for that IP address. In that case, the relationship between the IP address and the server 250 may persist, but the connection may be temporarily stopped as the load balancer 210 skips over that IP address when making transaction assignments.

In some embodiments, the virtual networking layer 220 may be enabled to remove IP addresses entirely, thus avoiding future transaction assignments to that IP address. The virtual networking layer 220 may additionally, or alternatively, be enabled to add IP addresses as needed, arranging a mapping between each new IP address and one of the existing servers 250.

In some embodiments, the virtual networking layer 220 may use the application programming interface (API) of the load balancer 210 to indicate that a particular IP address is still around but not currently available for new traffic. This type of API is available in many existing hardware load balancers. In this case, again, the mapping of the IP address to the server 250 need not change.

In some embodiments, the virtual networking layer 220 may perform periodic traffic reduction for the connection between an IP address and its corresponding server 250. For example, to request half the traffic flow, the virtual networking layer 220 may reduce traffic (e.g., by using the API to indicate the IP address should not receive traffic) every half minute, and may resume the traffic flow for the other half minute.

Figure 4:
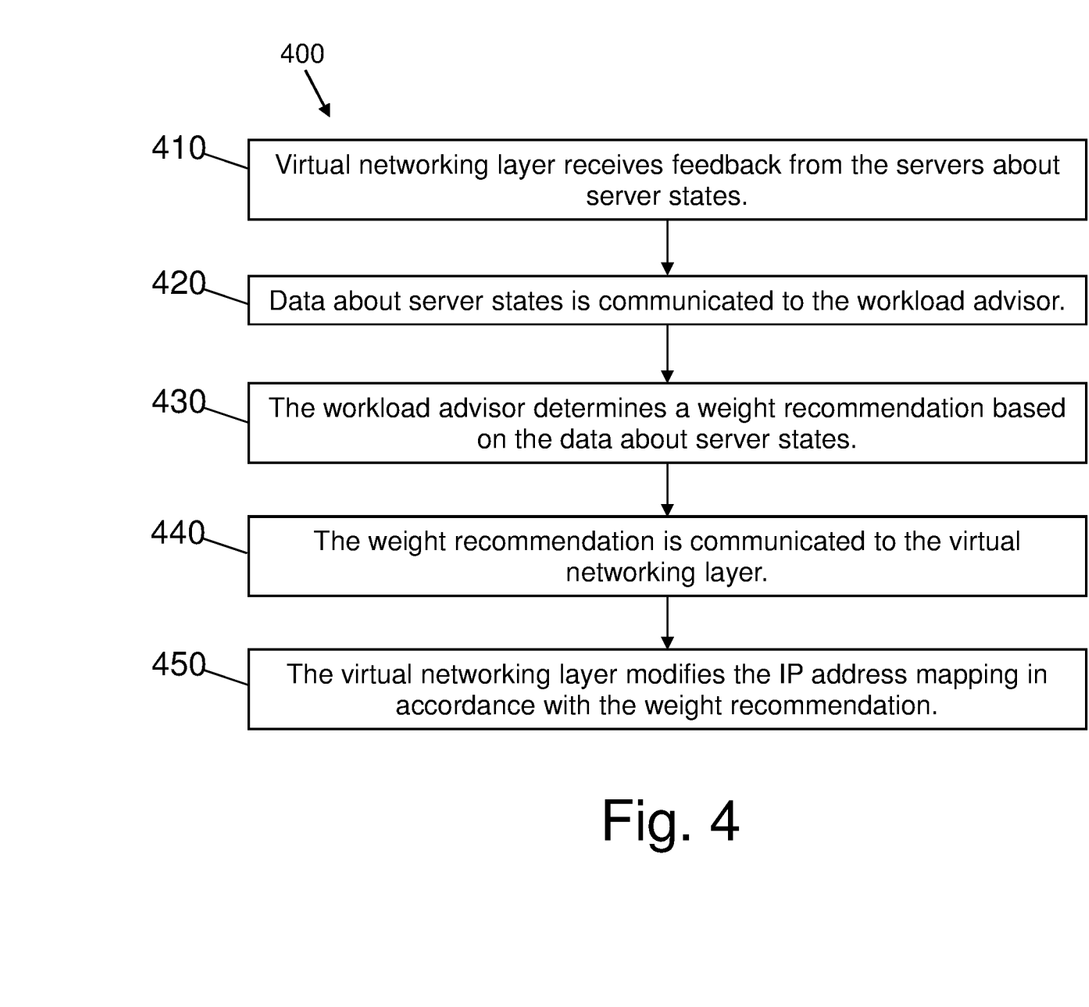
FIG. 4 is a flow diagram of a method for distributing transaction in the distribution system, according to an exemplary embodiment of this disclosure.

FIG. 4 is a flow diagram of a method 400 for distributing transactions, according to an exemplary embodiment of this disclosure. It will be understood that, throughout this method 400, transactions are being received at the load balancer 210 and assigned to the IP addresses. At block 410, the virtual networking layer 220 receives feedback from the servers 250 about their current states. At block 420, the virtual networking layer 220 communicates that feedback to the workload advisor 230. At block 430, the workload advisor analyzes the data from the servers 250 and determines a weight recommendation for the servers 250. At block 440, the weight recommendation is communicated to the virtual networking layer 220. At block 450, the virtual networking layer 220 modifies the IP address mapping in an attempt to achieve the weight recommendation.

Thus, exemplary embodiments of the distribution system 200 may incorporate conventional load balancers and may enable the load balancer 210 to use its existing features (e.g., detect and act on the availability of a network resource, manage a persistent session, filter network traffic, behave as a firewall, use intelligent traffic compression, etc.). At the same time, the distribution system 200 may take advantage of recommendations from the workload advisor 230. Further, the distribution system 200 need not require the load balancer's vendor to expend effort developing and supporting SASP. In other words, in some embodiments, the load balancer 210 need not be modified from a conventional load balancer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more processors, a weight recommendation for a plurality of servers, wherein the weight recommendation defines a goal for distributing transactions among the servers;
assigning, by the one or more processors, a first many-to-one mapping between the plurality of servers and a plurality of IP addresses, the number of servers being less than the number of IP addresses, wherein the first many-to-one mapping comprises associating a first server from the plurality of servers with a first subset of IP addresses from the plurality of IP addresses based on the weight recommendation;
in response to receiving, by the one or more processors, from a load balancer, a first plurality of transactions directed to the plurality of IP addresses, assigning the first plurality of transactions to the IP addresses in a predetermined manner, independent of the weight recommendation, and the transactions are distributed among the plurality of servers according to the first mapping;
in response to detecting a performance degradation at the first server, determining dynamically, by the one or more processors, a reduced weight recommendation of the first server, and a second many-to-one mapping from the plurality of IP addresses to the plurality of servers, the second many-to-one mapping being based on the reduced weight recommendation;
transitioning dynamically from the first many-to-one mapping to the second many-to-one mapping, wherein the second many-to-one mapping comprises associating the first server with a second subset of IP addresses that has fewer IP addresses compared to the first subset; and
in response to receiving, by the one or more processors, from the load balancer, a second plurality of transactions directed to the plurality of IP addresses, assigning the second plurality of transactions to the IP addresses in the predetermined manner, independent of the weight recommendation, and the transactions are distributed among the plurality of servers according to the second mapping
wherein the transactions are distributed among the plurality of IP addresses in a round-robin distribution manner.

2. The method of claim 1, wherein routing the second plurality of transactions to the servers according to the second mapping further comprises:
directing a first transaction, of the second plurality of transactions, to a first IP address to which the first transaction is assigned in the round-robin distribution; and
identifying a destination server, from the servers, that is associated with the first IP address in the second mapping, wherein the destination server for the first transaction is determined based on the round-robin distribution and based on the second mapping.

3. The method of claim 1, wherein modifying how many of the IP addresses are mapped to each of the servers comprises adjusting the mapping to redistribute the IP addresses among the servers to achieve a set of server weights closer to the weight recommendation than a current set of server weights.

4. The method of claim 1, wherein modifying how many of the IP addresses are mapped to each of the servers comprises reassigning the a first IP address from a second server to a first server.

5. The method of claim 1, wherein in response to the reduced weight recommendation the number of IP addresses mapped to the servers is reduced.

6. The method of claim 5, further comprises indicating to the load balancer the IP addresses that are removed.

7. A system comprising:
a memory having computer readable instructions; and
one or more processors for executing the computer readable instructions to perform a method comprising:
receiving a weight recommendation for a plurality of servers, wherein the weight recommendation defines a goal for distributing transactions among the servers;

assigning a first many-to-one mapping between the plurality of servers and a plurality of IP addresses, the number of servers being less than the number of IP addresses, wherein the first many-to-one mapping comprises associating a first server from the plurality of servers with a first subset of IP addresses from the plurality of IP addresses based on the weight recommendation;

in response to receiving from a load balancer, a first plurality of transactions directed to the plurality of IP addresses, assigning the first plurality of transactions to the IP addresses in a predetermined manner, independent of the weight recommendation, and the transactions are distributed among the plurality of servers according to the first mapping;

in response to detecting a performance degradation at the first server, determining dynamically, a reduced weight recommendation of the first server, and a second many-to-one mapping from the plurality of IP addresses to the plurality of servers, the second many-to-one mapping being based on the reduced weight recommendation;

transitioning dynamically from the first many-to-one mapping to the second many-to-one mapping, wherein the second many-to-one mapping comprises associating the first server with a second subset of IP addresses that has fewer IP addresses compared to the first subset; and in response to receiving from the load balancer, a second plurality of transactions directed to the plurality of IP addresses, assigning the second plurality of transactions to the IP addresses in the predetermined manner, independent of the weight recommendation, and the transactions are distributed among the plurality of servers according to the second mapping wherein the transactions are distributed among the plurality of IP addresses in a round-robin distribution manner.

8. The system of claim 7, wherein routing the second plurality of transactions to the servers according to the second mapping further comprises:

directing a first transaction, of the second plurality of transactions, to a first IP address to which the first transaction is assigned in the round-robin distribution; and identifying a destination server, from the servers, that is associated with the first IP address in the second mapping, wherein the destination server for the first transaction is determined based on the round robin distribution and based on the second mapping.

9. The system of claim 7, wherein modifying how many of the IP addresses are mapped to each of the servers comprises adjusting the mapping to redistribute the IP addresses among the servers to achieve a set of server weights closer to the weight recommendation than a current set of server weights.

10. The system of claim 7, wherein modifying how many of the IP addresses are mapped to each of the servers comprises reassigning the a first IP address from a second server to a first server.

11. The system of claim 7, wherein in response to the reduced weight recommendation the number of IP addresses mapped to the servers is reduced.

12. The system of claim 11, further comprises indicating to the load balancer the IP addresses that are removed.

13. A computer program product comprising a non-transitory computer readable storage medium having computer readable program code embodied thereon, the computer readable program code executable by a processor to perform a method comprising:

receiving a weight recommendation for a plurality of servers, wherein the weight recommendation defines a goal for distributing transactions among the servers;

assigning a first many-to-one mapping between the plurality of servers and a plurality of IP addresses, the number of servers being less than the number of IP addresses, wherein the first many-to-one mapping comprises associating a first server from the plurality of servers with a first subset of IP addresses from the plurality of IP addresses based on the weight recommendation;

in response to receiving from a load balancer, a first plurality of transactions directed to the plurality of IP addresses, assigning the first plurality of transactions to the IP addresses in a predetermined manner, independent of the weight recommendation, and the transactions are distributed among the plurality of servers according to the first mapping;

in response to detecting a performance degradation at the first server, determining dynamically, a reduced weight recommendation of the first server, and a second many-to-one mapping from the plurality of IP addresses to the plurality of servers, the second many-to-one mapping being based on the reduced weight recommendation;

transitioning dynamically from the first many-to-one mapping to the second many-to-one mapping, wherein the second many-to-one mapping comprises associating the first server with a second subset of IP addresses that has fewer IP addresses compared to the first subset; and in response to receiving from the load balancer, a second plurality of transactions directed to the plurality of IP addresses, assigning the second plurality of transactions to the IP addresses in the predetermined manner, independent of the weight recommendation, and the transactions are distributed among the plurality of servers according to the second mapping;

wherein the transactions are distributed among the plurality of IP addresses in a round-robin distribution manner.

14. The computer program product of claim 13, wherein routing the second plurality of transactions to the servers according to the second mapping further comprises:

directing a first transaction, of the second plurality of transactions, to a first IP address to which the first transaction is assigned in the round-robin distribution; and identifying a destination server, from the servers, that is associated with the first IP address in the second mapping, wherein the destination server for the first transaction is determined based on the round-robin distribution and based on the second mapping.

15. The computer program product of claim 13, wherein modifying how many of the IP addresses are mapped to each of the servers comprises adjusting the mapping to redistribute the IP addresses among the servers to achieve a set of server weights closer to the weight recommendation than a current set of server weights.

16. The computer program product of claim 13, wherein modifying how many of the IP addresses are mapped to each of the servers comprises reassigning the a first IP address from a second server to a first server.

17. The computer program product of claim 13, wherein in response to the reduced weight recommendation the number of IP addresses mapped to the servers is reduced.

\* \* \* \* \*